UNITED STATES PATENT OFFICE.

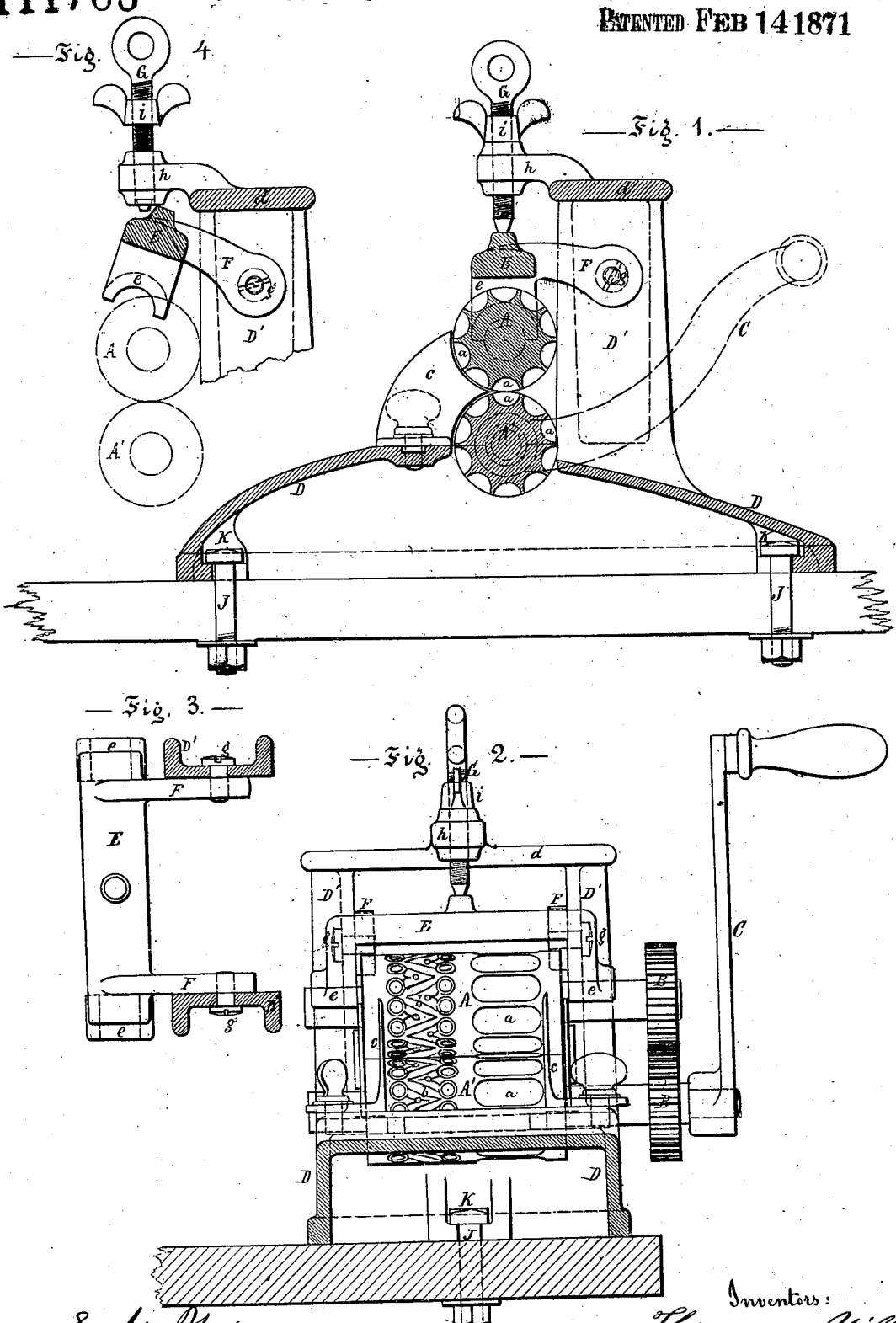

THOMAS MILLS AND GEORGE M. MILLS, OF PHILADELPHIA, PA.

IMPROVEMENT IN MACHINES FOR MAKING CANDY.

Specification forming part of Letters Patent No. 111,765, dated February 14, 1871.

*To all whom it may concern:*

Be it known that we, THOMAS MILLS and GEORGE M. MILLS, of the city of Philadelphia and State of Pennsylvania, have invented certain Improvements in Machines for Making "Fruit-Drop" Candies, of which the following is a specification.

Our invention relates to the kind of machines in which candy figures of a great variety of shapes are molded by passing the candy of proper consistency between a pair of rolls which have a series of correctly-mated dies recessed into their periphery. Into these molds or dies the pliable candy is pressed by the rotation of the rolls, the small candy figures emerging at the rear end of the rolls. One and the same frame structure answers for a considerable number of pairs of rolls; and the first part of our invention relates to a simplified and very convenient arrangement for changing the rolls and for holding and adjusting the inserted set in working condition. In place of the separate caps for each set of bearings at both ends of the rolls, which required the entire removal of said caps and the unscrewing of at least four holding-down screws, we substitute a swing-frame containing the caps of both bearings suspended in the main frame of the machine, and so arranged that by the manipulation of a single adjusting-screw (and without entirely detaching any part of the mechanism,) one set of rolls may be removed and another set inserted in their place in much less time than is required with the frames in present use.

The second part of our invention relates to a peculiar configuration of the basis of the machine, whereby the use of separate entablatures for carrying the candy to and from the rolls is avoided, the frame being so shaped as to provide smooth unbroken surfaces of convenient size at both sides of the rolls, the heads of the holding-down screws being held in suitable pockets cast in the bottom of the frame at each end, so that the screws are not visible at the top and do not impede the ingress and egress of the candy.

In the accompanying drawings, Figure 1 is a sectional side view of a machine embodying our invention. Fig. 2 is an end view of the same, partly in section. Fig. 3 is a plan of the swing-frame, and showing a transverse section of the main frame through the line $x$ $y$, Fig. 1. Fig. 4 is a detached sectional view of the swing-frame, showing it in position for removing a pair of rolls and inserting another pair.

A A' are the rolls, each provided with halves of molds $a$ $a$ $b$ $b$ in their peripheries. They are geared together by means of the spur-wheels B B on their shafts, and are rotated by means of a crank, C, attached to the shaft of the lower roll, A'. This roll has its bearings in the main frame D of the machine, which also carries in front of the rolls a pair of adjustable side guides, $c$ $c$, for leading the candy to the rolls. These side guides may be set to expose the entire length of the recessed portion of the rolls, or they may be brought nearer together and set to conduct the candy to one set of the figures, thus occupying either half of the length of the rolls. In the rear of the rolls A A' the main frame D has two uprights, D', united at the top by a cross-girt, $d$.

E is the swing-frame, which holds the top roll, A, down to its place on the lower one.

$e$ $e$ are half journal-boxes provided on E, in which the shaft of A rotates.

F F are two backward-extending arms cast on E, and on these arms the frame E is suspended and swings in the manner fully understood on reference to Figs. 1 and 4, the screw-pins $g$ $g$ acting as fulcrums.

G is a set-screw carried in a projecting lug, $h$, on cross-girt $d$. This set-screw serves to hold the swing-frame and rolls down in the position shown in Fig. 1, and when this set-screw G is raised, as in Fig. 4, the frame E is free to swing upward, so that the rolls may be taken out and others put into the machine.

$i$ is a jam-nut on the screw G, to secure the latter in any required position of adjustment.

The configuration of the light hollow base of frame D and the provisions for fastening down the machine by means of bolts J J, held in pockets K K, are fully understood by reference to Fig. 1. It will be seen that on the front side of the machine the bed is conveniently shaped for feeding the candy to the rolls by hand, while at the rear end the bed forms a smooth inclined plane for conducting the small candy figures to a bench or table. The bolts J J being entirely below the top surface of the two ends, the frame casting itself takes the place of the sheet-metal entablatures heretofore provided for taking the candy to and from the rolls.

We claim as our invention—

1. The combination, with the rolls A A' and frame D, of the swing-frame E and adjusting-screw G, substantially as and for the purpose hereinbefore set forth.

2. In combination with the rolls A A' and side guides, c c, the basis of frame D and pockets K K, when relatively arranged as and for the purpose set forth.

THOMAS MILLS.
GEO. M. MILLS.

Witnesses:
   E. M. HENRY,
   THEODORE BERGNER.